UNGATED CONTINUOUS COLOR SEQUENCE DISPLAYS

Filed Dec. 23, 1954 4 Sheets-Sheet 1

WITNESSES
Edwin E. Bassler
John J. Callahan

INVENTOR
Gordon S. Ley
BY F. E. Browder
ATTORNEY

Sept. 22, 1959 G. S. LEY 2,905,750

UNGATED CONTINUOUS COLOR SEQUENCE DISPLAYS

Filed Dec. 23, 1954 4 Sheets-Sheet 2

Sept. 22, 1959 G. S. LEY 2,905,750

UNGATED CONTINUOUS COLOR SEQUENCE DISPLAYS

Filed Dec. 23, 1954 4 Sheets-Sheet 3

Sept. 22, 1959 G. S. LEY 2,905,750

UNGATED CONTINUOUS COLOR SEQUENCE DISPLAYS

Filed Dec. 23, 1954 4 Sheets-Sheet 4

2,905,750

UNGATED CONTINUOUS COLOR SEQUENCE DISPLAYS

Gordon S. Ley, Plainfield, N.J., assignor to Westinghouse Electric Corporation, East Pittsburgh, Pa., a corporation of Pennsylvania Application December 23, 1954, Serial No. 477,240

9 Claims. (Cl. 178—5.4)

This invention relates to television receiver systems, and more particularly to color television receiver systems in which signals representing different primary colors are sequentially displayed in a continuous color sequence.

The National Television System Committee (NTSC) signal specifications describe a signal in which the picture information is transmitted by two simultaneous signal or voltage components. One of these components is called the monochrome signal and it supplies all the luminance (picture brightness) information. The other signal component is called the color subcarrier or chrominance signal and it supplies the picture coloring information which, when combined electrically with the monochrome signal and supplied to a tri-color picture tube, reproduces for visual display the televised color picture.

Since the NTSC signal is simultaneous in nature, either simultaneous or sequential color displays can be used in the color television receiver. A continuous color sequence display is one in which the beam of the display device successively excites the color phosphors in a repeating color sequence. When this type of display is performed at a rapid rate it is termed dot-sequential operation. In an article entitled "Processing of the NTSC Color Signal For One-Gun Sequential Displays" by B. D. Loughlin which appears at page 299 of the January 1954 issue of the Proceedings of the IRE, there is described means for directly processing the NTSC signal at a color receiver to form a signal suitable for a one-gun sequential display. Such a signal is representative of different information respecting the three primary color components of the televised color picture at time-spaced intervals which recur at a predetermined rate equal to the frequency of the NTSC subcarrier. For the tube employed in the color television receiver system of one embodiment of my invention, the color sampling frequency is equal to the frequency of the NTSC subcarrier. For the tube employed in the system of another embodiment, the color sampling operation occurs at a different frequency such as 6 megacycles. The continuous color sequence display proposed by the author of the above-entitled article requires a gating operation to achieve good color purity. The gating operation is one in which the incoming video information is combined with a suitable signal to produce a single video signal, which is proportional to the primary color voltages one at a time in the correct sequence. The single video signal may then be impressed on the gun control electrodes of a color picture tube.

If the NTSC signal is transformed by a mild degree of axis selection and M minus Y (M—Y) conversion to an equi-angular signal, the signal has the form $$E=K_1[M+E_{cd}\cos(W_st+\phi)]$$

where $K_1$=constant to include amplifier gain
$M$=the monochrome component of the transformed signal
$E_{cd}$=the amplitude of the chrominance carrier component
$W_s$=the radian frequency of the color subcarrier ($2\pi f$)
$\phi$=the phase angle indicating the particular dominant wavelength being transmitted (measure of hue). Y is the monochrome or brightness component of the NTSC signal and equals $0.30E_{r'}+0.59E_{g'}+0.11E_{b'}$. In terms of the gamma corrected color signals $E_{r'}$, $E_{g'}$ and $E_{b'}$ in the NTSC specification,
$M=\frac{1}{3}(E_{r'}+E_{b'}+E_{g'})$, $X=E_{g'}-\frac{1}{2}(E_{r'}+E_{b'})$ and $Z=\frac{1}{2}\sqrt{3}(E_{r'}-E_{b'})$. X and Z are components of $E_{cd}$ used to describe the phase angles indicating the dominant wavelengths being transmitted.

If the display is a cathode ray tube with a plurality of groups of parallelly arranged strips of phosphor material which, upon impingement by the cathode-ray beam, fluoresce to produce light of three different primary colors, and the sequence of the phosphor strips is repeated over the area of the display, $t$ is chosen so that the beam is on the red phosphor for $-\pi/3<W_st<\pi/3$, on the blue phosphor for
$\pi/3<W_st<\pi$, and on the green phosphor for
$\pi<W_st<5\pi/3$. E is the grid to cathode voltage above black level.

In accordance with my invention, to the sinusoidal chrominance signal is added a wave shaping second harmonic component which is introduced with inverted phase by mixing $AE_{cd}\cos(W_st+\phi)$ with $B\cos 3W_st$ and selecting the lower sideband so that the signal appears in the form $E=m+AE_{cd}\cos(\theta+\phi)+CE_{cd}\cos(2\theta-\phi)$ where $\theta=W_st$. $\phi$ is the measure of hue and the small lettered subscript ($cd$) stands for color difference. The letter $m$ is the monochrome component of the transformed signal. A is a constant chosen for best picture quality. In the examples used in the Figures 3, 4, 5, A is chosen to be 0.64. B is a constant chosen in accordance with the nature of the mixer to provide with A an appropriate value for C, which in the example cited above is 0.32.

This signal meets the following requirements:

(1) The wave shape is preserved but translated through $-120°$ in $\theta$, one phosphor strip interval, for an increase in phase ($\phi$) of 120°, the spacing between primaries (also secondaries).

(2) The wave shape is inverted for a change of 180° in phase ($\phi$). Since each primary is 180° from a secondary, the sum of their two signals if equal, except 180° apart in phase, cancels the color difference to give white light.

(3) The wave shape for a primary ($\phi=2n\pi/3$), is of the form $E\theta=a\cos(\theta+2n\pi/3)+b\cos 2(\theta+2n\pi/3)$. Requirement two will then make a secondary of the form $E\theta=a\cos[\theta+(2n-1)\pi/3]-B\cos 2[\theta+(2n-1)\pi/3]$ since $\phi_s=(2n-1)\pi/3$. $E\theta$ is the portion of $E=m+AE_{cd}\cos(\theta+\phi)+CE_{cd}\cos(2\theta-\phi)$ dependent on $\theta$. The letter $n$ is any integer, the letter $a$ equals $AE_{cd}$, and the letter $b$ equals $CE_{cd}$. $\phi_s$ is the phase angle associated with a secondary hue.

(4) The wave shape for a tertiary $\phi=(4n\pm1)\pi/6$ is of the form $E\theta=a\cos[\theta+(4n\pm1)\pi/6]+b\sin 2[\theta+(4n\pm1)\pi/6]$. These form approximately a two-step staircase.

It is an object of this invention to provide an improved television receiver system capable of high fidelity reproduction of televised images in natural color.

It is another object of this invention to provide an improved television receiver system utilizing a sequential display with a continuous color sequence.

It is another object of this invention to provide a color television receiver system utilizing an ungated continuous color sequence display.

It is another object to provide a color television receiver system utilizing an ungated continuous color sequence display in which the fundamental and second harmonic of the color subcarrier is introduced in suitable phase relationship to reproduce with high fidelity televised images in natural color.

It is another object to provide a color television receiver system with means for shaping the video signal to increase color purity in a sequential display using a continuous color sequence.

It is another object to provide a color television receiver system utilizing an ungated continuous color sequence display with color switching means in which a fundamental and a second harmonic voltage are introduced in suitable phase relationship to reproduce with high fidelity televised images in natural color.

It is another object to provide a color television receiver system utilizing an ungated continuous color sequence display with means for producing a substantially stair-step color switching signal.

It is another object to provide an improved color television receiver system utilizing a dot-sequential operation in which the electron beam excites the phosphor of a color picture tube in a continuous color sequence.

These and other objects are effected as will be apparent from the following description and claims taken in accordance with the accompanying drawings which form a part of this application and in which:

My invention will first be described with reference to a television receiver system utilizing a cathode ray tube having a beam interceptive structure comprising vertical stripes of fluorescent materials which respond to electrode impingement to produce light of three different primary colors. The stripes are arranged in laterally displaced color triplets, each triplet comprising three vertical phosphor strips producing light of different primary colors. The beam interceptive structure comprises beam indexing elements. In such a system, the position of the electron beam relative to the beam interceptive structure of the tube is indicated by the indexing elements so arranged as to produce a signal whose time of occurrence is indicative of the time at which the cathode ray beam attains a predetermined position. A color television receiver system employing such a cathode ray tube is set forth in detail in U.S. Patent 2,667,534, granted January 26, 1954 to E. M. Creamer, Jr. and M. E. Partin, entitled "Electrical System."

Figure 1:
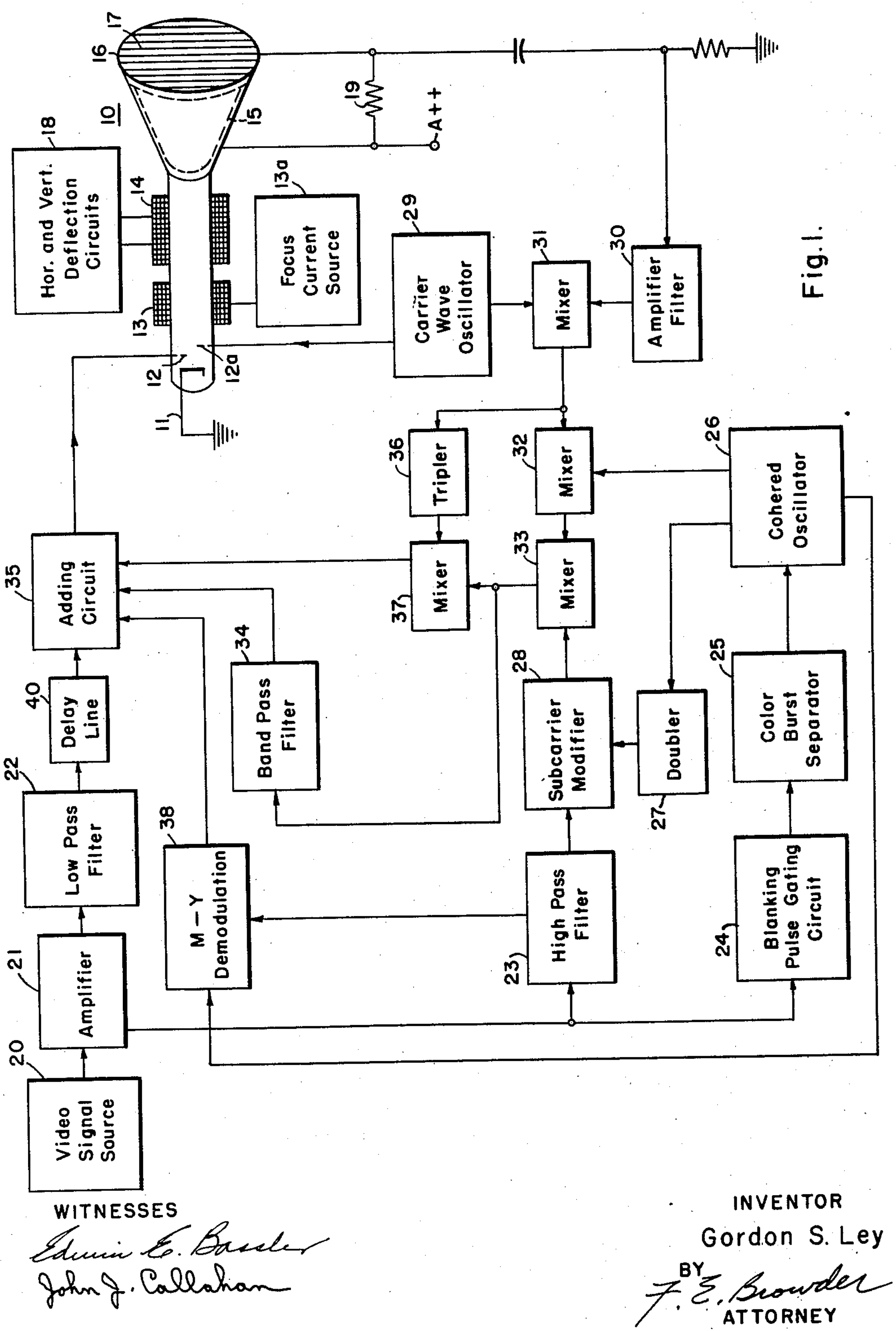
Figure 1 is a schematic diagram showing a color television receiver system embodying my invention.

Referring to Fig. 1 in detail, I show a color television picture-reproducing tube 10 having a cathode 11, a writing beam control grid electrode 12, a pilot beam control grid electrode **12*a*, a focus coil 13, horizontal and vertical deflection coils 14, accelerating anode 15, face plate 16 and screen structure 17. The tube 10 is connected to suitable sources of focus current 13*a* and accelerating anode potential A++ and to conventional horizontal and deflection circuits 18. A resistor 19 interconnects anode 15 and screen structure 17**.

The NTSC video signals appearing at the output of video signal source 20 are supplied to a conventional video amplifier 21. The output from the video amplifier 21 is then supplied to a low pass filter 22, a high pass filter 23 and a blanking pulse gating circuit 24. The low frequency or brightness components of the composite signal are separated from the remainder of the signal by the low pass filter 22 which is transmissive of signal components in substantially the 0 to 3 megacycles in frequency. The color synchronizing bursts are separated from the remainder of the composite signal by first applying this composite signal to the blanking pulse gating circuit 24 which is amplitude discriminatory to transmit only signals superimposed on the blanking pulse. The gating circuit 24 will transmit only the horizontal synchronizing pulses and the color synchronizing bursts, these being the only signals whose amplitude level exceeds that of the blanking pulses. The output of the blanking pulse gating circuit 24 is supplied to a color burst separator and amplifier 25 which passes amplitude signals of 3.58 megacycle frequency to the substantial exclusion of all others, thereby rejecting the horizontal synchronizing pulses which occur at approximately 15.75 kilocycles. The color synchronizing bursts which appear at intervals of 1 horizontal scanning line in the output of the color burst separator and amplifier 25 are utilized to operate a cohered oscillator 26 which produces a continuous signal of 3.58 megacycles frequency. This continuous signal has the same phase characteristics as the color synchronizing bursts.

The output from the cohered oscillator 26 is supplied to the frequency doubler 27 where the 3.58 megacycle input signal is increased to a 7.2 megacycle signal. This 7.2 megacycle signal is then supplied to a subcarrier modifier 28 which is simpltaneously supplied with the high frequency color signal derived from the high phase filter 23. The NTSC chrominance signal is modified in the subcarrier modifier 28 to produce an equi-angular chrominance or subcarrier signal suitable for a dot-sequential display.

A 39 megacycle carrier wave is produced by the carrier wave oscillator 29 and supplied to the pilot beam control grid **12*a*. Other signal components are supplied to the writing beam control grid 12, to be described in more detail hereinafter. The output of the carrier wave oscillator 29 produces corresponding variations in the potential across resistor 19, these variations being modulated at the rate of traversal of indexing stripes in the screen structure 17 by the pilot beam as the latter is deflected across the screen structure. Heterodyne components will appear across resistor 19 and the amplifier filter 30 will derive therefrom the difference frequency heterodyne component. The amplifier filter 30 is proportioned so as to transmit only signal components in the frequency range of 33 megacycles to the substantial exclusion of all other signal components. The output of filter 30 is supplied to mixer 31 along with the output from carrier wave oscillator 29. There is then selected from the output of mixer 31, one heterodyne component which under the illustrative conditions is the 6 megacycle component. This 6 megacycle heterodyne output component of mixer 31 is then supplied to mixer 32. Mixer 32 is simultaneously supplied with an output from cohered oscillator 26. There is selected from the output of mixer 32 one heterodyne component which is the 9.58 megacycle component. This 9.58 megacycle heterodyne output component of mixer 32 is next supplied to another mixer 33. Mixer 33 is simultaneously supplied with the chrominance signal derived from subcarrier modifier 28. These two input signals are heterodyned by the mixer 33 and from its output there is selected the difference frequency component which is 6 megacycles. In the output circuit of mixer 33 there is provided a bandpass filter 34 which selects from among the output components of mixer 33 the difference frequency which lies in the 6 megacycle frequency range. The color signal appearing at the output of bandpass filter 34 is supplied to the adding circuit 35** where it is additively combined with other signal components to be described in more detail hereinafter.

The output from mixer 31 is also supplied to a tripler 36 where the 6 megacycle input signal is increased to an 18 megacycle signal. This 18 megacycle signal is then supplied to mixer 37. Mixer 37 is simultaneously supplied with the output from mixer 33. These two input signals are heterodyned by the mixer 37 and from its output there is selected the difference frequency heterodyne component which is a signal of 12 megacycles nominal frequency. The output signal of mixer 37 is then supplied to the adding circuit 35.

The output from the cohered oscillator 26 is also supplied to the M—Y demodulator 38 along with the chrominance signal derived from the high pass filter 23. The 3.58 megacycle signal from the cohered oscillator 26 demodulates the chrominance signal supplied to the M—Y demodulator 38 to produce a signal which, when added to the monochrome component of the NTSC signal produces a signal with a monochrome component suitable for a dot-sequential display.

The low frequency or brightness signal appearing at the output of the low pass filter 22 is passed through a delay line 40 so that the monochrome and chrominance components arrive in time coincidence at the adding circuit 35. The output from the delay line 40 is combined with the output from the M—Y demodulator, the bandpass filter 34 and the mixer 37 in the adding circuit 35. The output from the adding circuit 35 is in the form suitable for a dot-sequential display and the signal is impressed on the control grid 12 of the cathode ray tube 10.

The M—Y demodulator 38 produces a signal, ($M-Y=-25E_{g'}+0.03E_{r'}+0.22E_{b'}$) which when added to the monochrome component (Y) of the NTSC signal produces a signal suitable for a dot-sequential display which has a monochrome component in the form, $M=\frac{1}{3}(E'_r+E'_b+E'_g)$. The signal suitable for a dot-sequential display also has a subcarrier which can be described by two components, $X=E_{g'}-\frac{1}{2}(E_{r'}+E_{b'})$ and $Z=\frac{1}{2}\sqrt{3}(E_{r'}-E_{b'})$. The NTSC subcarrier or chrominance signal is heterodyned in the subcarrier modifier 28 with a second harmonic reference subcarrier from the frequency doubler 27 to produce the desired chominance signal. A more detailed description and operation of the circuits used for processing the NTSC signal at the television receiver to produce a dot-sequential signal suitable for a continuous color sequence display is set forth in the previously cited article by B. D. Loughlin at pages 301 to 303.

Figure 2:
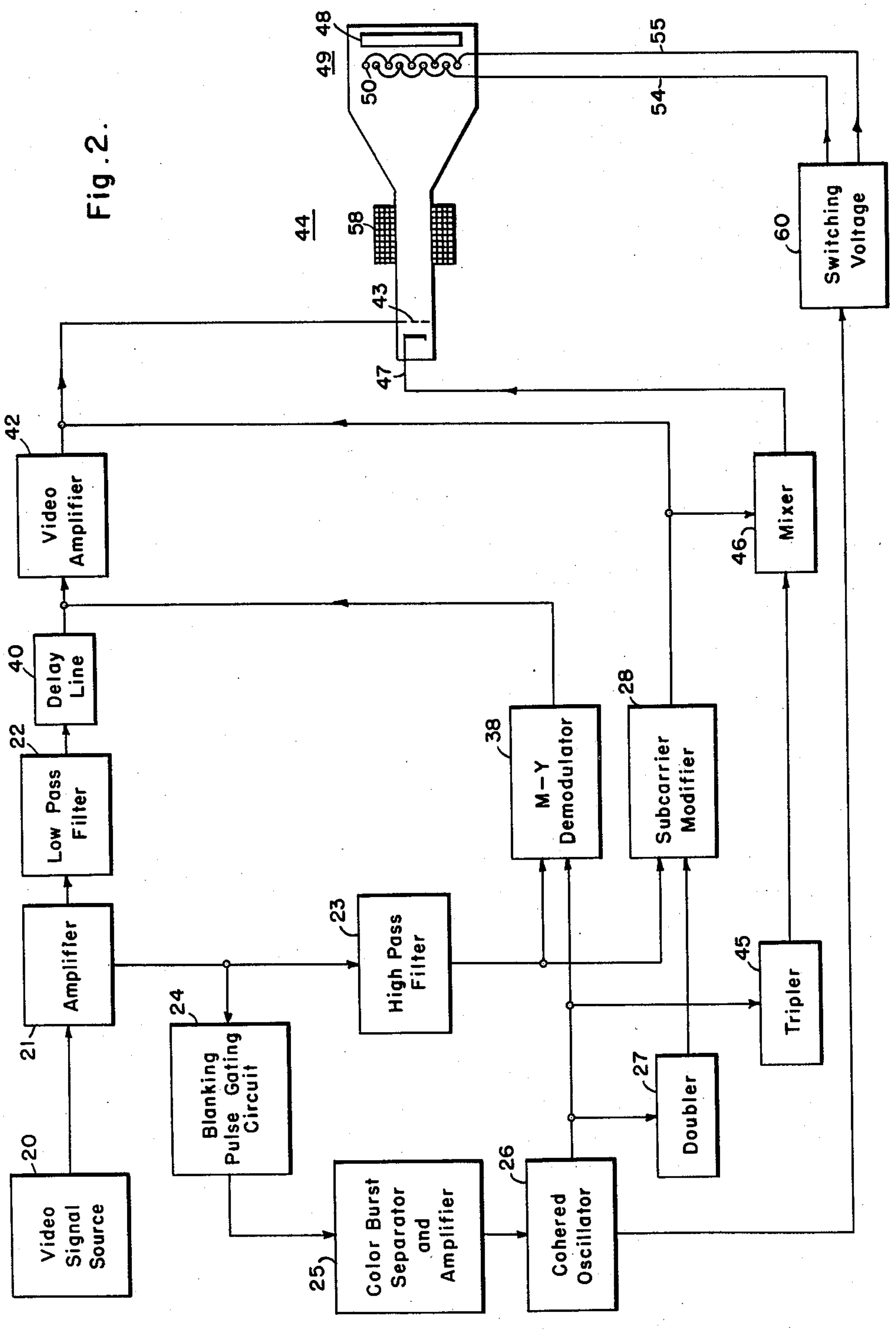
Fig. 2 is a schematic diagram showing another color television receiver system embodying my invention.

Referring to Fig. 2 in detail, the NTSC video signals appearing at the output of the video signal source 20 are supplied to a conventional video amplifier 21. The output from the video amplifier 21 is then supplied to a low pass filter 22, a high pass filter 23 and a blanking pulse gating circuit 24. The low frequency or brightness components of the composite signal are separated from the remainder of the signal by the low pass filter 22 which is transmissive of signal components in substantially the 0 to 3 megacycle range. A delay line 40 is provided in the output circuit of the filter 22 so that the monochrome and chrominance components are combined in time coincidence. The high frequency color component of the composite signal is separated from all other components by means of the high pass filter 23 which transmits only signals above 3 megacycles in frequency. The color synchronizing bursts are separated from the remainder of the composite signal by first applying this composite signal to the blanking pulse gating circuit 24. The gating circuit 24 will transmit only the horizontal synchronizing pulses and the color synchronizing bursts. The output of the gating circuit 24 is supplied to a color burst separator and amplifier 25 which passes amplified signals of 3.58 megacycle frequency to the substantial exclusion of all others, thereby rejecting the horizontal synchronizing pulses which occur approximately at 15.75 kilocycles. The color synchronizing bursts which appear at intervals of one horizontal scanning line in the output of the color burst separator and amplifier 25 are utilized to operate a cohered oscillator 26 which produces a continuous signal of 3.58 megacycles. This continuous signal has the same phase characteristics as the color synchronizing bursts.

The output from the cohered oscillator 26 is supplied to the M—Y demodulator 38 along with the high frequency color signal derived from the high pass filter 23.

The output from the cohered oscillator 26 is also supplied to the frequency doubler 27 where the 3.58 megacycle input signal is increased to a 7.2 megacycle signal. This 7.2 megacycle signal is then supplied to a subcarrier modifier 28 which is simultaneously supplied with the high frequency color signal derived from the high pass filter 23.

The NTSC high frequency color signal is modified in the M—Y demodulator 38 and is supplied to a video amplifier 42 along with the low frequency signal from the delay line 40. The NTSC high frequency color signal is also modified in the subcarrier modifier 28 and the output signal is supplied to the control grid 43 of the picture tube 44 along with the output from the video amplifier 42. Thus, a signal suitable for a dot-sequential display is impressed on the control grid 43 of the picture tube 44.

The output from the cohered oscillator 26 is also supplied to the frequency tripler 45 where the 3.58 megacycle input signal is increased to a 10.74 megacycle signal. This 10.74 megacycle signal is then supplied to a mixer 46 which is simultaneously supplied with chrominance signal derived from the subcarrier modifier 28. These two input signals are heterodyned by the mixer 46 and from its output there is selected the difference frequency heterodyne component which is a signal of 7.16 megacycles. The output signal of mixer 46 is then supplied to the cathode 47 of the cathode ray tube 44 with inverted phase to give addition with the signals supplied to the control grid 43 of the tube 44.

The picture tube 44 is a color tube which has a phosphor screen 48 with a large number of fine, substantially equally spaced and substantially parallel lines which operate in groups of four, each group consisting of line fluorescing in red when impinged by the electron beam of the tube, an adjacent line fluorescing in green when impinged by the electron beam, a next adjacent line which fluoresces in blue when impinged by the electron beam and a further adjacent line which fluoresces in green when impinged by the electron beam. A color deflection electrode 49 comprises two sets of grid or deflection wires 50, one set is in alignment with each of the red phosphor lines and the other set is in alignment with the blue phosphor lines. The wires in alignment with one of said color phosphor lines are brought external to the color tube 44 by means of the lead 54. The wires in alignment with the other color phosphor lines are brought external to the color tube 44 by means of the lead 55. A suitable electrostatic or electromagnetic deflection arrangement as represented by the deflection coils 58 is provided around the neck portion of the tube 44 for the deflection of the electron beam in both the vertical and horizontal directions. The deflection coils 58 operate to provide the necessary horizontal and vertical scanning to the electron beam so as to cause the electron beam to scan a raster pattern on the back of the phosphor screen 48. The leads 54 and 55 are connected to a suitable switching voltage source indicated as a whole by the reference numeral 60 which is connected between the deflection wires 50 and the cohered oscillator 26.

For color switching at the deflection wires 50 of the picture tube 44 a substantially stair-step switching voltage is obtained by driving a suitable circuit with a current rich in the second harmonic of the color switching frequency. In the television receiver system described in Fig. 2, the 3.58 megacycle signal from the cohered oscillator 26 is supplied to a switching voltage source 60. Color switching occurs at a frequency equal to the NTSC subcarrier frequency. The switching voltage source 60 may comprise a class C amplifier from which a current rich in the second harmonic of the color switching frequency is used to drive two tuned circuits to produce a substantially stair-step color switching voltage. The color switching voltage thus produced is supplied to the deflection wires 50 of the picture tube 44. There are various circuits which may be used to tune out the capacity of the color deflection wires 50 at the fundamental frequency of 3.58 megacycles and at the second harmonic frequency of 7.16 megacycles. For example, two tuned circuits wherein the coefficient of coupling is greater than the coefficient of critical coupling, with the deflection wires 50 forming the secondary of one of the tuned circuits, may be used. If more second harmonic voltage is required an additional Class C amplifier can be utilized with a suitable phase shifter provided in its input circuit.

When a potential difference of proper magnitude is applied between the two sets of deflection wires, the electron beam of the tube will be deflected to the phosphor line lying under the more positive wire. When there is no potential applied to the deflection wires the beam will be focused to the green phosphor line. The color switching voltage applied to the deflection wires 60 will be of correct magnitude relative to the beam energy from the electron gun so that the beam is deflected to the correct phosphor line in a dot-sequential sequence.

It is apparent that my invention may be utilized in any color television receiver system wherein the electron beam can be excited in a continuous color sequence without any appreciable period when the beam spends time on phosphor lines not representative of the color information displayed by the electron beam.

Figure 3:
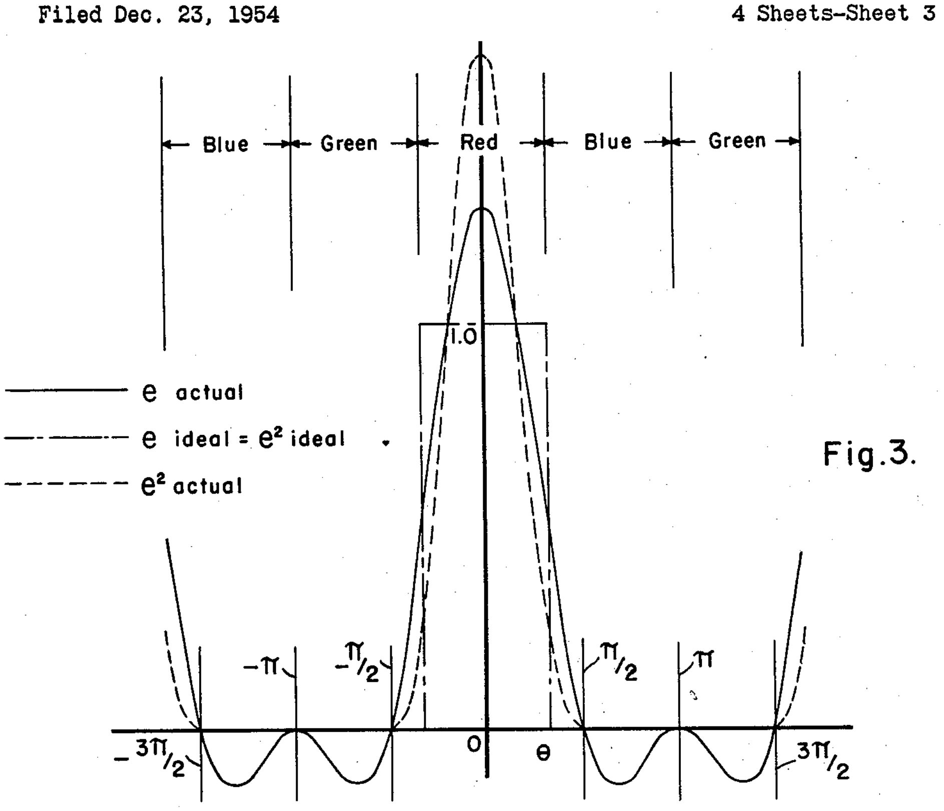
Fig. 3 is a wave form of a saturated primary produced in accordance with my invention.
Figure 4:
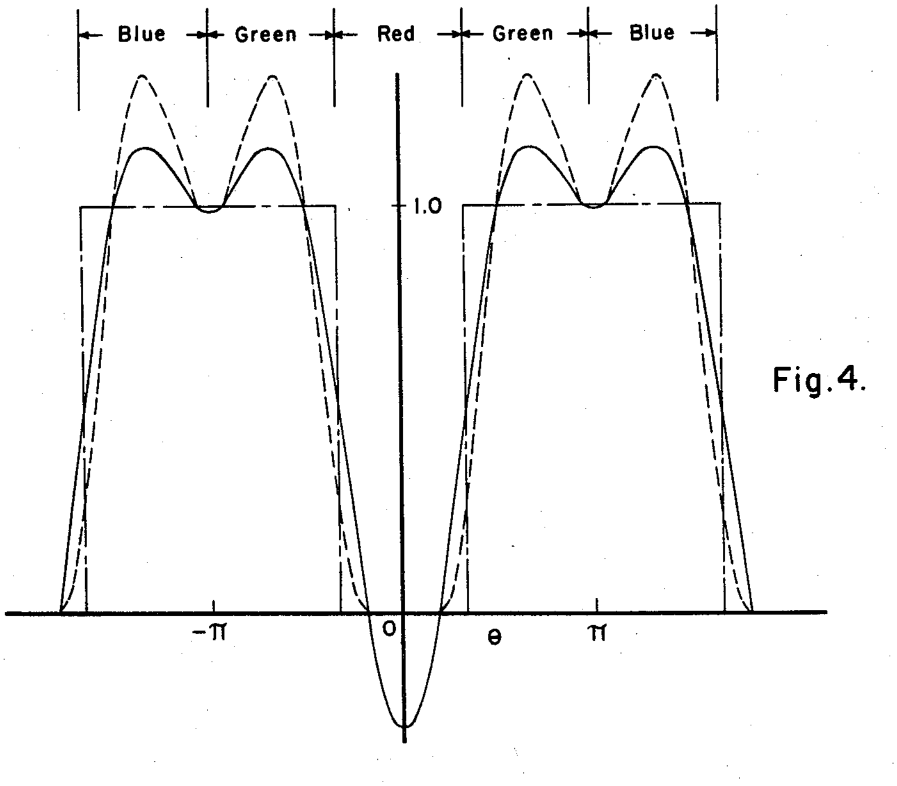
Fig. 4 is a wave form of a saturated secondary produced in accordance with my invention.
Figure 5:
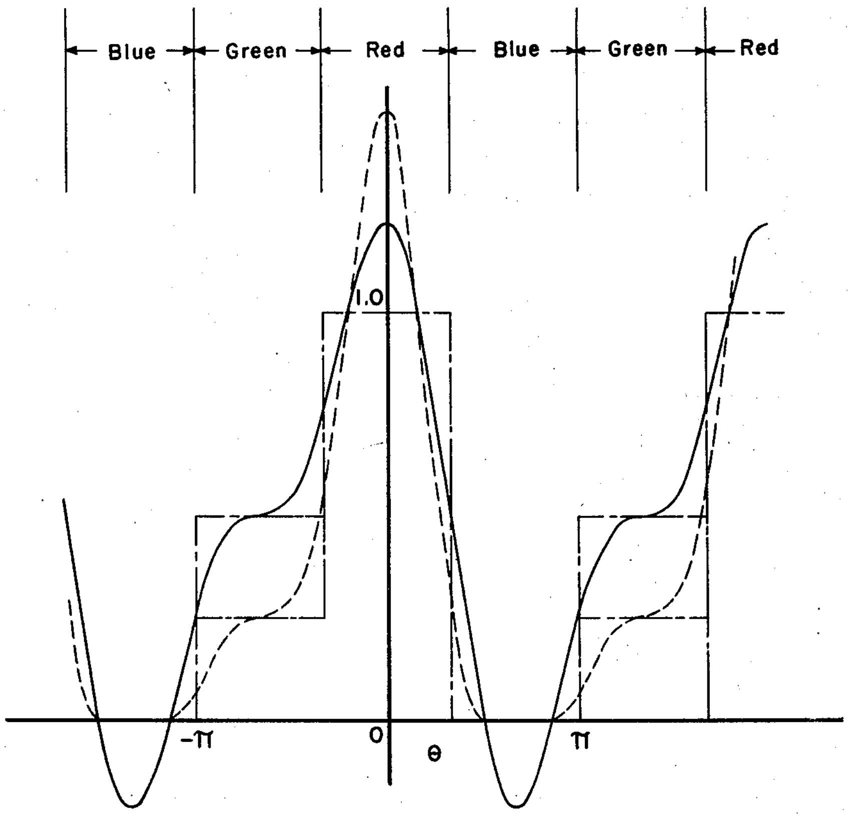
Fig. 5 is a wave form of a saturated tertiary produced in accordance with my invention.

In Figs. 3, 4 and 5 of the drawings, the wave forms of a saturated primary, a saturated secondary and a saturated tertiary, provided in accordance with my invention are shown respectively.

In Fig. 3:

$$e=m+0.64\ E_{cd}\cos(\theta+\phi)+0.32\ E_{cd}\cos(2\theta-\phi).$$
$$m=1/3;\ E_{cd}=1.0;\ \phi=0,\ 2\ \pi/3,\ 4\ \pi/3.$$

$\phi=0$ (Red Bar is shown).

In Fig. 4:

$$e=m+0.64\ E_{cd}\cos(\theta+\phi)+0.32\ E_{cd}\cos(\theta-\phi).$$
$$m=2/3;\ E_{cd}=1.0;\ \phi=(2n+1)\ \pi/3.$$

$\phi=\pi$ (Cyan Bar is shown).

In Fig. 5:

$$e=m+0.64\ E_{cd}\cos(\theta+\theta)+0.32\ E_{cd}\cos(2\theta-\varphi).$$
$$m=1/2;\ E_{cd}=\sqrt{3/2};\ \theta=(2n+1)\ \pi/6.$$

$\phi=\pi/6$ (Orange Bar is shown); $E'_r=1$; $E'_g=1/2$.

In Figs. 3, 4 and 5 the relative light fluxes $e^2$ for a gamma exponent equal to 2.0 have also been plotted. My invention thus provides excellent color fidelity for small color differences and excellent fidelity on saturated bars for display devices with gamma approximately equal to 2.0.

Although my invention has been described with reference to certain specific color television receiver systems utilizing different color picture tubes, numerous modifications falling within the spirit and the scope of the invention will be apparent to those skilled in the art after the benefit of the above teachings have been obtained.

I claim as my invention:

1. In a dot-sequential color television receiver system, means for modifying the video signal to obtain color purity in a color tube utilizing an ungated continuous color sequence display, said means comprising first means for deriving a first carrier signal modulated with color-signal components; second means for deriving a second carrier signal harmonically related to said first carrier and modulated with color signal components; and output means coupled to said first means and said second means for combining said carrier signals with the video signal.

2. In a dot-sequential color television receiver system, a signal translating channel for modifying the video signal to obtain color purity in a color tube utilizing an ungated continuous color sequence display, said channel comprising first means for producing a first carrier signal modulated with color-signal components; second means for deriving a second carrier signal of a frequency twice the frequency at which representations of different color information in said first carrier signal are sequenced, and means for combining said carrier signals with a monochrome video signal.

3. In a color television receiver system, means providing a first carrier signal representative of different color information at intervals recurring at a predetermined rate, a cathode ray tube comprising an electron gun for generating an electron beam and an image screen provided with primary color phosphor lines, means for producing a second carrier signal modulated with color signal components and having a nominal frequency which is the second harmonic of said first carrier signal, means for modulating said electron beam with said first and second carrier signals, and means for directing said electron beam toward said image screen to successively excite said primary color phosphor lines in a repeating color sequence, whereby the combination of said first and second carrier signals excites said color phosphor lines in a repeating color sequence to produce a color image display of improved chromatic fidelity.

4. In a color television receiver system, means providing a first carrier signal representative of different color information at intervals recurring at a predetermined rate, means for producing a second carrier signal representative of different color information at intervals recurring at a rate twice the rate of said first carrier signal is representative of different color information, said signal having inverted phase in relation to said image signal, and means for combining said second carrier signal with said first carrier signal and applying said combined carrier signals to an image display device to produce a color image of improved color purity.

5. In a color television receiver system, means providing a first chrominance modulated carrier signal representative of different color information at intervals recurring at a predetermined rate, a cathode ray tube comprising an electron gun for generating an electron beam and an image screen provided with primary color phosphor lines, means for deriving a second carrier signal having a frequency corresponding to the second harmonic component of said first carrier signal, means for modulating said electron beam with said first and second carrier signals, means for directing said electron beam toward said image screen to scan a raster pattern thereon, a color deflection electrode positioned between said image screen and said electron gun, means for producing a signal having a predetermined fundamental frequency and a second harmonic component, and means for applying said signal to said color deflection electrode for controlling excitation of said phosphor lines in accordance with representations of different color information in said first and second carrier signals.

6. In a color television receiver system, means providing a first chrominance modulated carrier signal representative of different color information at intervals recurring at a predetermined rate, a cathode ray tube comprising an electron gun for generating an electron beam and an image screen provided with primary color phosphor lines, means for producing a second chrominance modulated carrier signal representative of different color information at intervals recurring at a rate twice the rate of said image signal is representative of different color information, said second carrier signal having inverted phase in relation to said first carrier signal, means for modulating said electron beam with said first and second carrier signals, means for directing said electron beam toward said image screen to scan a raster pattern thereon, a color deflection electrode positioned between said image screen and said electron gun, means for producing a second signal having a predetermined fundamental frequency and a second harmonic component, and means for applying said second signal to said color deflection electrode for controlling excitation of said phosphor lines in accordance with representation of different color information in said first carrier signal as modified by said second carrier signal, whereby the combination of first and second carrier signals excites said color phosphor lines in a repeating color sequence to produce a color image display of improved chromatic fidelity.

7. In a color television receiver system, means providing an image signal comprising monochrome and chrominance components representative of different color information at intervals recurring at a rate predetermined by the frequency of said chrominance component, a cathode ray tube comprising an electron gun for generating an electron beam and an image screen provided with primary color phosphor lines, means for deriving from said image signal a first carrier signal modulated with chrominance components and having a predetermined nominal frequency, means for deriving from said image signal a second carrier signal modulated with chrominance components and having a nominal frequency corresponding to a harmonic of said predetermined nominal frequency, means for modulating said electron beam with said image signal and said first and second carrier signals, and means for directing said electron beam toward said image screen to successively excite said primary color phosphor lines in a repeating sequence.

8. In a color television receiver employing non-gated continuous color sequence display, a source of composite video-frequency signal representative of a color image and having as components a monochrome signal and a subcarrier wave modulated in amplitude and phase by color-signal components, a first signal translating channel coupled to said source and including a network for translating at least the low frequency component of said monochrome signal, a second signal translating channel coupled to said source and including means for translating said subcarrier wave, means for deriving therefrom a first subcarrier signal modulated with color-signal components, means for deriving a second subcarrier signal harmonically related to said first subcarrier signal and modulated with color-signal components, and output circuit means coupled to said first and second signal translating channels for supplying said translated monochrome signal and said derived signals to a continuous color sequence display device, whereby said display device is excited in a continuous color sequence by direct application of said color-signal modulated first and second subcarrier signals to produce a color image of improved chromatic fidelity.

9. In a color television receiver employing non-gated continuous color sequence display, a source of composite video-frequency signal representative of a color image and having as components a monochrome signal and a subcarrier wave modulated in amplitude and phase by color-signal components, a first signal translating channel coupled to said source and including a network for translating at least the low-frequency component of said monochrome signal, a second signal translating channel coupled to said source and including means for translating said subcarrier wave, means for deriving therefrom a first subcarrier signal modulated with color-signal components, means for deriving a second subcarrier signal of a nominal frequency substantially equal to twice that of said first subcarrier signal and modulated with color-signal components, and means for effectively combining said monochrome signal translated by said first channel with said derived subcarrier signals to produce desired color modulated composite signals.

References Cited in the file of this patent

UNITED STATES PATENTS

| | | |
|---|---|---|
| 2,725,419 | Houghton | Nov. 29, 1955 |
| 2,725,421 | Valdes | Nov. 29, 1955 |
| 2,759,042 | Partin | Aug. 14, 1956 |
| 2,772,324 | Boothroyd | Nov. 27, 1956 |
| 2,782,252 | Fedde | Feb. 19, 1957 |

Notice of Adverse Decision in Interference

In Interference No. 92,138 involving Patent No. 2,905,750, G. S. Ley, Ungated continuous color sequence displays, final judgment adverse to the patentee was rendered Nov. 13, 1963, as to claims 1, 2, 3, 7, 8 and 9.

[*Official Gazette December 22, 1964.*]